United States Patent [19]
Rothfuss et al.

[11] Patent Number: 5,279,993
[45] Date of Patent: Jan. 18, 1994

[54] GAS INJECTION STONE AND PROCESS OF MANUFACTURE THEREOF

[75] Inventors: Hans Rothfuss, Taunusstein; Herbert Metzger, Duisburg; Manfred Winkelmann, Krefeld; Jochen Kopia, Bendorf, all of Fed. Rep. of Germany

[73] Assignee: Didier-Werke AG, Wiesbaden, Fed. Rep. of Germany

[21] Appl. No.: 804,030

[22] Filed: Dec. 9, 1991

[30] Foreign Application Priority Data

Dec. 8, 1990 [DE] Fed. Rep. of Germany ....... 4039232

[51] Int. Cl.$^5$ ..................... C04B 38/00; C04B 38/06
[52] U.S. Cl. ........................ 501/81; 106/122; 264/41; 264/42; 264/441; 501/80
[58] Field of Search ............. 501/80, 81, 39; 264/41, 264/42, 44; 106/122

[56] References Cited

FOREIGN PATENT DOCUMENTS

| | | |
|---|---|---|
| 174529 | 3/1986 | European Pat. Off. . |
| 0304551 | 3/1989 | European Pat. Off. . |
| 0325709 | 8/1989 | European Pat. Off. . |
| 3246937 | 7/1983 | Fed. Rep. of Germany . |
| 3503221 | 8/1986 | Fed. Rep. of Germany . |
| 3802657 | 9/1989 | Fed. Rep. of Germany . |
| 3907500 | 8/1990 | Fed. Rep. of Germany . |
| 1271201 | 7/1960 | France . |
| 2238683 | 2/1975 | France . |
| 36362 | 8/1983 | Japan . |
| 51675 | 8/1983 | Japan . |
| 86476 | 10/1984 | Japan . |

OTHER PUBLICATIONS

Chemical Abstracts, vol. 93, No. 8, Aug. 1980, Columbus, Ohio, US; abstract no. 78168A, T. Ochiai et al., Nippon Steel Corp.: 'Development and application of special refractories for gas injection' p. 397; Taikabutsu 1980, 267, 179–87 Abstract.

*Primary Examiner*—Helene Klemanski
*Assistant Examiner*—Michael A. Marcheschi
*Attorney, Agent, or Firm*—Wenderoth, Lind & Ponack

[57] ABSTRACT

A gas injection stone is manufactured by embedding in a refractory compound a plurality of adjacent and abutting nets. Thereby, when the refractory compound is solidified and when the nets subsequently are removed by burning or melting, the result will be the formation within the stone of plural interconnected layers of interlinked gas channels.

39 Claims, 1 Drawing Sheet

GAS INJECTION STONE AND PROCESS OF MANUFACTURE THEREOF

BACKGROUND OF THE INVENTION

The present invention relates to a gas flushing or injection stone and a process for the manufacture thereof, particularly wherein a net is embedded in a refractory material or compound employed to form the stone, and such net subsequently is removed by burning or melting, with the result that a plurality of gas channels are formed in the stone.

Gas injection stones of this general type are disclosed in German DE 32 46 937 A1 and in German DE 35 03 221 C2. The flushing action or degree of gas injection is limited by the threads or webs of the net used to form the gas channels. If it is desired to increase the degree of gas injection, i.e. the gas permeability of the stone, the cross sections of the threads or webs of the net may be increased, such that the cross sections of the resultant gas channels are increased. This however results in a disadvantage in that the gas bubbles that flow into a molten material at an outlet end of the stone are undesirably large. Such large gas bubbles counteract the achieving of a gentle gas injection or flushing operation. Furthermore, a large cross section of the gas channels may lead to the penetration of the molten material into the outlet ends of the gas channels, and this is a highly undesirable result.

German DE-PS 38 02 657 discloses a gas flushing stone having a gas permeable spacing member that exhibits varying geometric shapes in the direction of wear of the stone. Thus, depending upon the state of wear of the stone at a particular time, a particular geometric pattern will become visible on the inner surface of the stone.

SUMMARY OF THE INVENTION

With the above discussion in mind, it is an object of the present invention to provide a gas injection or flushing stone and a process of manufacture thereof whereby it is possible to overcome the above and other prior art disadvantages, and whereby it is possible to combine the advantages of the above prior art arrangements, while avoiding such disadvantages and indeed providing a stone of significantly improved operational flexibility and reliability.

Particularly, it is an object of the present invention to provide such a stone and process of manufacture thereof whereby the stone has improved injection or flushing capability, i.e. increased permeability, while at the same time achieving gentle or smooth gas injection.

The above and other objects of the present invention are achieved by the feature that when manufacturing the stone a plurality of adjacent abutting nets are embedded within the refractory material or compound employed to form the stone. When such nets subsequently are removed by burning or melting, the result will be that the stone has formed therein a plurality of adjacent and abutting, and thereby interlinked layers of interlinked gas channels.

The process in accordance with the present invention thus is just as simple and no more complicated to carry out than the known manufacturing processes. In accordance with the invention, instead of employing one net, it is merely necessary to embed several nets in the refractory compound. These nets subsequently jointly are burned or melted away to form a plurality of layers of interlinked gas channels. The gas permeability of the resultant stone is significantly improved by the provision of a plurality of interlinked layers of gas channels. Thus, an increased volume of gas can be guided through the gas channels and the gas permeability of the stone thereby is increased. However, this increased volume of gas is divided among a very large number of gas channels having relatively small cross sections, for example the same cross section as prior art gas channels. As a result, the gas bubbles injected into a molten material at the gas outlet end of the stone will remain relatively small, even with an increased total volume of gas passing through the stone. Therefore, it is possible to achieve a delicately sensitive control of gas flow volume. Furthermore, since the cross sectional size of the individual gas channels is not increased, there will not be the danger of molten metal flow into such gas channels.

Further in accordance with the present invention, since the plural nets are embedded in the refractory compound in abutting fashion, when such nets subsequently are removed, open connections are produced between gas channels of adjacent layers of gas channels. This results in improved uniformity of gas injection throughout the stone, because such connections avoid any possibility of discontinuity of particular gas channels. In other words, the gas channels of adjacent layers are interlinked, and thereby there will be a smooth and uniform flow of gas throughout the interlinked layers of gas channels.

BRIEF DESCRIPTION OF THE DRAWINGS

Other objects, advantages and features of specific embodiments of the present invention will be apparent from the following detailed description, with reference to the accompanying drawings, wherein.

DETAILED DESCRIPTION OF THE INVENTION

Figure 1:
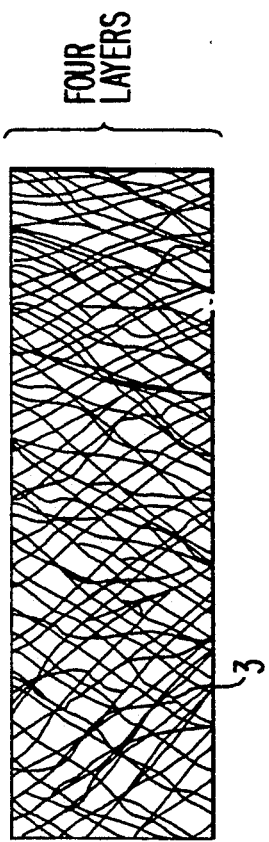
FIG. 1 is a schematic view representing a plurality of superimposed nets employed in accordance with the method of the present invention for the formation of a gas injection stone in accordance with the present invention.

Shown schematically in FIG. 1 is a representation of a plurality of nets 3 superimposed in abutting relationship. Particularly, FIG. 1 is intended to illustrate four such layers or nets. These nets are to be embedded in refractory compound or material employed for the formation of a gas injection or flushing stone. Nets 3 may be, for example, plastic nets, such that when they subsequently are removed from the refractory material they are melted away. Also, the nets could be of suitable fabric-type material, such that removal of the nets is achieved by burning. The plural nets may have approximately identical thread or web thicknesses, for example approximately 0.3 mm. However, such thickness also could be less, for example approximately 0.15 mm.

Figure 2:
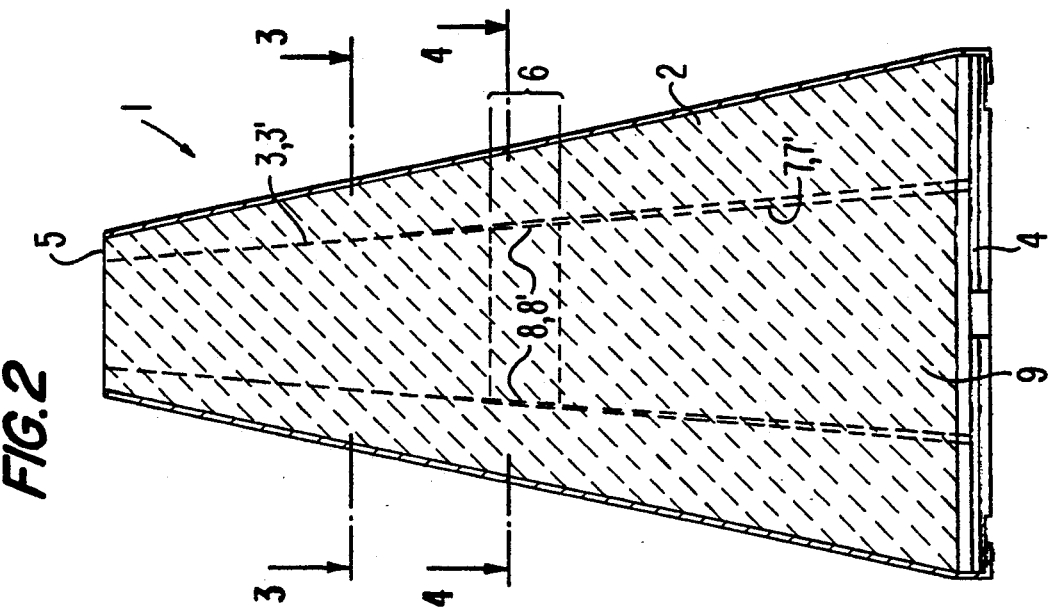
FIG. 2 is a longitudinal cross sectional view of a gas injection or flushing stone in accordance with the present invention and particularly illustrating a number of features of the present invention.

FIG. 2 illustrates somewhat schematically a gas flushing or injection stone 1 that is intended to be generally conventional, with the exception of the incorporated features of the present invention. Thus, the stone 1 includes a gas inlet end 4 and a gas outlet end 5. The stone also can include a gas inlet manifold and an outer metal jacket as illustrated in FIG. 2. These features themselves are intended to be conventional, and other shapes and arrangements as conventional in the art may be employed.

In the manufacture of the stone 1, an outer section 2 of refractory material first is poured into a suitable mold. Subsequently, a plurality of abutting hose-shaped nets 3 are embedded in the refractory compound. Following insertion of the plural nets 3, an inner part 9 of the refractory compound is poured into the mold. Following hardening of the refractory compound, the nets 3 are removed by appropriate burning or melting. The result will be the formation of a plurality of adjacent layers of interlinked or cross-linked gas channels 3'. Thus, gas channels of each layer will be connected or interlinked with gas channels of adjacent layers. The result will be that the stone allows injection of an increased volume of gas. The flow of gas throughout the gas channels of the plural interlinked layers will be uniform. It thereby will be possible to achieve a fine and sensitive control of gas flow volume. This can be done by changing the gas inlet pressure, since small changes in pressure do not lead to large changes in flow volume, but rather larger changes in pressure produce smaller changes in flow volume.

In the embodiment of the present invention described above, the nets are provided to extend from gas inlet end 4 to gas outlet end 5. As a result, the plural adjacent and interconnected layers of gas channels 3' will extend from gas inlet end 4 to gas outlet end 5 of the finished stone.

The present invention however also contemplates modifications of such an arrangement.

For example, as illustrated in FIG. 2, it is possible to position within the refractory material at least one additional net 7. Net 7 preferably may have threads or webs of a larger size than those of the nets 3. A plurality of adjacent and abutting nets 7 may be provided, but it also is contemplated to employ a single net 7. When net 7 subsequently is removed, the result will be a layer, or plural adjacent layers, of interlinked gas channels 7' of a size larger than gas channels 3'. Net 7 is provided over only a portion of the height of the stone, i.e. from the inlet end 4 to a position short of the outlet end 5. A purpose for the provision of net 7 and resultant gas channels 7' of increased size is to achieve a situation whereby, when the stone 1 becomes worn away during use, it is possible to achieve an increase in flow of the gas. For example, when the stone becomes worn away to the area of the inner end of gas channels 7', the gas flow will be increased, and this increase can be used for various purposes, for example detection of the relative degree of wear of the stone.

It is possible to provide an arrangement whereby net 7, which has a restricted height, is positioned adjacent a plurality of nets 3 that extend throughout the height of the stone. This however is not necessary, and it would be possible to provide the plural nets 3 to extend only from the inner end of net 7 to the outlet end 5 of the stone. In other words, in such an arrangement net 7, or perhaps plural nets 7, could extend from inlet end 4 to an intermediate position of the height of the stone, and plural nets 3 could extend from this intermediate position to the outlet end 5 of the stone. In such an arrangement, adjacent ends of nets 7 and 3 would be in abutment, so that the resulting gas channels 7' and 3' would be connected in the finished stone. As indicated, the threads or webs of net 7 have a thickness greater than the threads or webs of nets 3. For example, the thickness of the threads or webs of net 7 could be approximately 0.5 mm.

Figure 4:
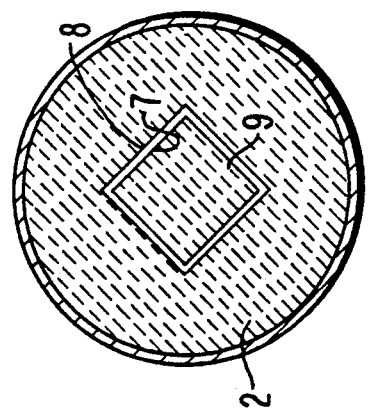
FIGS. 3 and 4 are transverse cross sectional views taken along lines 3—3 and 4—4, respectively, in FIG. 2.
Figure 3:
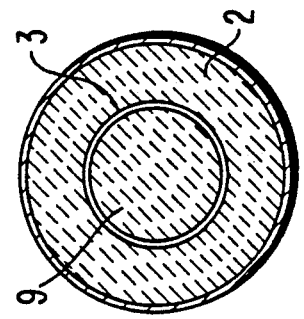

Additionally, illustrated in FIGS. 2-4 is an even further modification in accordance with the present invention. Particularly, embedded within the refractory compound during the manufacture of the stone is a solid strap or web 8. When such strap or web subsequently is removed by burning or melting, the result will be an entirely open channel 8' defining a wear detection area or zone 6. Area 6 may be employed to provide an indication of the relative degree of wear of the stone. For example, one way of achieving such an indication would be by a visual observance of the wear of the stone as far as area 6. Solid web 8 may be provided of the same cross sectional configuration as nets 3 and/or 7. Also, web 8 may be provided in addition to the above described nets 3, 7.

However, it also would be advantageous in accordance with an additional feature of the present invention to connect the interior ends of plural nets 3 with the interior end of net or nets 7. This might be achieved, for example, by providing web or strap 8 to be of an adhesive nature, thereby connecting adjacent ends of nets 3, 7 during the formation of the stone.

In accordance with an additional feature of the present invention, particularly illustrated in FIGS. 3 and 4, the gas channels 3' and 7' may be of different configurations. For example, as illustrated in FIG. 3, gas channels 3' may be arranged in a circular cross-sectional configuration. Gas channels 7' may be arranged in a different cross-sectional configuration, for example square as illustrated in FIG. 4. The transition between the circular and square configurations may be achieved in wear detection zone 6, as also illustrated in FIG. 4. This feature of the present invention is useful in further detection of the relative degree of wear of the stone, for example in the manner discussed in the above noted German DE-PS 38 02 657. Thus, a relatively unworn stone 1 will provide, upon visual inspection from the interior of a metallurgical vessel, a circular visual indication of wear, due to the circular configuration of gas channels 3'. When the wear of the stone has advanced to the wear detection area 6, the visual indication of wear will change to square, due to the square configuration of open channel 8' and/or gas channel 7'.

It is to be understood that in accordance with the present invention the strap 8 and channel 8' can be dispensed with when the arrangement does not include nets 7 and gas channels 7'. Even when nets 7 and channels 7' are provided, strap 8 and open channel 8' are not necessary. Furthermore, when strap 8 and open channel 8' are not provided, it still is possible to arrange one length portion of the gas channels in one cross-sectional arrangement and another length portion of the gas channels in a different cross-sectional arrangement, thereby still providing the change in visual appearance discussed above. Furthermore, it is to be understood that the arrangement of strap 8 and open channel 8' is particularly advantageous if the adjacent ends of nets 3 and 7 are to be connected.

Although the present invention has been described and illustrated with respect to preferred features, it is to be understood that various modifications and changes may be made to the specifically described and illustrated arrangements without departing from the scope of the present invention. It furthermore is to be understood that radially adjacent nets 3 (or possibly 3 and 7) are intended to be provided in radial abutment, without radial spaces therebetween. Therefore, when the nets are removed, the resultant gas channels of adjacent gas channel layers will be interlinked and connected. It furthermore is to be understood that open channel 8 provides the advantage of connecting outlet end gas channels 3' with inlet end gas channels 7' and/or 3'. When open channel 8' is not so provided, then adjacent axial ends of outlet end nets 3 must be in point-to-point abutment with inlet end nets 7 and/or 3, to thereby provide axial continuity and connection between the gas channels from the inlet end 4 to the outlet end 5 of the stone.

We claim:

1. In a process for manufacturing a gas injection stone wherein a net formed of threads is embedded in a refractory compound used to form said stone, and wherein said net subsequently is removed from said stone by burning or melting, thereby forming a plurality of interlinked gas channels in said stone, the improvement comprising:

molding said refractory compound to form said stone with opposite gas inlet and gas outlet ends and to include a solid, nonporous inner refractory section surrounded by a solid nonporous outer refractory section, both said inner and outer refractory sections extending in a direction of a height dimension of said stone from said gas inlet end thereof to said gas outlet end thereof, and embedding a plurality of said nets in said refractory compound with said plurality of nets abutting one another in layers, thereby enabling the formation in said stone of plural interconnected layers of said interlinked gas channels upon subsequent removal of said nets by said burning or melting, said embedding comprising positioning said plurality of nets between a portion of said refractory compound to form said inner refractory section and a portion of said refractory compound to form said outer refractory section with said plurality of nets aligned in abutting relationship and extending in said direction.

2. The process as claimed in claim 1, comprising embedding said plurality of nets in said refractory compound such that said plural layers of gas channels extend from said gas inlet end of said stone to said gas outlet end thereof.

3. The process as claimed in claim 1, wherein said threads of all of said plurality of nets are of approximately the same thickness.

4. The process as claimed in claim 3, wherein said thickness is from 0.15 mm to 0.30 mm.

5. The process as claimed in claim 1, further comprising embedding at least one additional net in said refractory compound such that gas channels formed therefrom extend over only a portion of the height of said stone.

6. The process as claimed in claim 5, wherein said additional net is embedded such that said gas channels formed therefrom extend from said gas inlet end of said stone and terminate before said gas outlet end thereof.

7. The process as claimed in claim 6, further comprising embedding a solid strap in said refractory compound, and subsequently removing said strap from said stone by burning or melting to thereby form an open wear detection zone in said stone.

8. The process as claimed in claim 7, wherein said strap is embedded such that said wear detection zone is formed at a location between said gas inlet end of said stone and said gas outlet end thereof.

9. The process as claimed in claim 8, wherein said gas channels formed from said additional net terminate at said wear detection zone.

10. The process as claimed in claim 8, wherein said plurality of nets are embedded such that said plural layers of gas channels formed therefrom extend from said wear detection zone to said gas outlet end of said stone.

11. The process as claimed in claim 8, wherein said nets embedded in said refractory compound are shaped such that said gas channels are arranged in a first cross-sectional configuration from said gas inlet end of said stone to said wear detection zone and in a different second cross-sectional configuration from said wear detection zone to said gas outlet end of said stone.

12. The process as claimed in claim 11, wherein one said cross-sectional configuration is square, and the other said cross-sectional configuration is circular.

13. The process as claimed in claim 11, wherein said strap is embedded in said refractory compound in a shape such that said wear detection zone is formed in said first cross-sectional configuration.

14. The process as claimed in claim 6, wherein said plurality of nets are embedded in said refractory compound such that said gas channels formed therefrom extend only from said gas outlet end of said stone to said gas channels formed from said additional net.

15. The process as claimed in claim 5, wherein threads of said additional net have a thickness greater than that of said threads of said plurality of nets.

16. The process as claimed in claim 15, wherein said thickness is approximately 0.5 mm.

17. The process as claimed in claim 5, comprising embedding said additional net such that said gas channels formed therefrom interlink with said gas channels formed from said plurality of nets.

18. The process as claimed in claim 5, further comprising embedding a solid strap in said refractory compound to extend from said additional net to said plurality of nets.

19. The process as claimed in claim 1, further comprising shaping a first portion of said nets differently from a second portion of said nets, such that said gas channels formed from said first portion are arranged in a first cross-sectional configuration, and said gas channels formed from said second portion are arranged in a different second cross-sectional configuration.

20. The process as claimed in claim 1, wherein said plurality of nets are positioned such that said gas channels formed thereby open onto at least one end surface of said stone and separate respective ends of said inner and outer refractory sections.

21. A gas injection stone formed of a refractory material and having therein a plurality of interlinked gas channels, said stone comprising:

opposite gas inlet and gas outlet ends defining respective inlet and outlet surfaces of said stone;

a solid nonporous inner refractory section surrounded by a solid nonporous outer refractory section, both said inner and outer refractory sections extending in a direction of a height dimension of said stone from said inlet surface thereof to said outlet surface thereof;

said gas channels being located between said inner and outer refractory sections and extending in said direction from said gas inlet end of said stone to said gas outlet end thereof, and said gas channels opening onto said inlet and outlet surfaces and separating respective ends of said inner and outer refractory sections; and said gas channels comprising, at least over a portion of said height dimension of said stone, a plurality of adjacent abutting layers of interlinked gas channels, with said layers being aligned in said direction and with said gas channels of each said layer being interlinked with said gas channels of at least one adjacent said layer.

22. A stone as claimed in claim 21, wherein said plurality of layers of gas channels extend from said gas inlet end of said stone to said gas outlet end thereof.

23. A stone as claimed in claim 21, wherein said gas channels of said plurality of layers are of approximately the same width.

24. A stone as claimed in claim 23, wherein said width is from 0.15 mm to 0.30 mm.

25. A stone as claimed in claim 23, further comprising at least one additional layer of gas channels extending over only a portion of said height dimension of said stone.

26. A stone as claimed in claim 25, wherein said additional layer of gas channels extends from said gas inlet end of said stone and terminates before said gas outlet end thereof.

27. A stone as claimed in claim 26, further comprising an open wear detection zone in said stone.

28. A stone as claimed in claim 27, wherein said wear detection zone is formed at a location between said gas inlet end of said stone and said gas outlet end thereof.

29. A stone as claimed in claim 27, wherein said additional gas channels terminate at said wear detection zone.

30. A stone as claimed in claim 28, wherein said plurality of layers of gas channels extend from said wear detection zone to said gas outlet end of said stone.

31. A stone as claimed in claim 28, wherein said gas channels are arranged in a first cross-sectional configuration from said gas inlet end of said stone to said wear detection zone and in a different second cross-sectional configuration from said wear detection zone to said gas outlet end of said stone.

32. A stone as claimed in claim 31, wherein one said cross-sectional configuration is square, and the other said cross-sectional configuration is circular.

33. A stone as claimed in claim 31, wherein said wear detection zone is formed in said first cross-sectional configuration.

34. A stone as claimed in claim 26, wherein said plurality of layers of gas channels extend only from said gas outlet end of said stone to said additional layer of gas channels.

35. A stone as claimed in claim 25, wherein gas channels of said additional layer have a width greater than that of said gas channels of said plurality of layers.

36. A stone as claimed in claim 35, wherein said width is approximately 0.5 mm.

37. A stone as claimed in claim 25, wherein said additional layer of gas channels interlink with said plurality of layers of gas channels.

38. A stone as claimed in claim 25, further comprising a substantially open wear detection zone in said refractory material extending from said additional layer of gas channels to said plurality of layers of gas channels.

39. A stone as claimed in claim 21, wherein a first portion of said gas channels are arranged in a first cross-sectional configuration, and a second portion of said gas channels are arranged in a different second cross-sectional configuration.

* * * * *